US012710070B2

(12) United States Patent
Chauvet et al.

(10) Patent No.: US 12,710,070 B2
(45) Date of Patent: Aug. 18, 2026

(54) DEVICE FOR CONNECTING MECHANICAL PARTS WITH AXIAL CLEARANCE

(71) Applicant: SAFRAN LANDING SYSTEMS, Vélizy-Villacoublay (FR)

(72) Inventors: Dominique Chauvet, Moissy-Cramayel (FR); Luis Ferreira Da Silva, Moissy-Cramayel (FR); Philippe Mosnier, Moissy-Cramayel (FR); Christophe Rioux, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 334 days.

(21) Appl. No.: 18/260,827

(22) PCT Filed: Jan. 6, 2022

(86) PCT No.: PCT/FR2022/050034
§ 371 (c)(1),
(2) Date: Jul. 10, 2023

(87) PCT Pub. No.: WO2022/152997
PCT Pub. Date: Jul. 21, 2022

(65) Prior Publication Data

US 2024/0068505 A1 Feb. 29, 2024

(30) Foreign Application Priority Data

Jan. 13, 2021 (FR) ...................................... 2100292

(51) Int. Cl.
*F16B 39/10* (2006.01)
*F16B 2/06* (2006.01)

(52) U.S. Cl.
CPC ............. *F16B 39/10* (2013.01); *F16B 2/065* (2013.01)

(58) Field of Classification Search
CPC .. F16B 2/06; F16B 2/065; F16B 39/10; F16B 39/103; Y10T 403/7062; Y10T 403/7067; Y10T 403/7075
(Continued)

(56) References Cited

U.S. PATENT DOCUMENTS

| | | | | |
|---|---|---|---|---|
| 1,090,908 A * | 3/1914 | Dimock | .................. | F16B 39/10 411/956 |
| RE15,379 E | 6/1922 | Bechberger | | |

(Continued)

FOREIGN PATENT DOCUMENTS

| | | |
|---|---|---|
| CN | 111868430 A | 10/2020 |
| FR | 539919 A | 7/1922 |

(Continued)

OTHER PUBLICATIONS

International Search Report mailed May 6, 2022, issued in corresponding International Application No. PCT/FR2022/050034, filed Jan. 6, 2022, 5 pages.

(Continued)

*Primary Examiner* — Amber R Anderson
*Assistant Examiner* — Kevin J Baynes
(74) *Attorney, Agent, or Firm* — CHRISTENSEN O'CONNOR JOHNSON KINDNESS PLLC

(57) ABSTRACT

A connecting device for connecting two mechanical parts includes a rod having a section between a stop and a threaded portion. The rod is inserted into the parts, and a nut is screwed onto the threaded portion in order to hold the parts between the stop and the nut. An anti-rotation system blocks rotation of the nut and includes a washer interacting with the rod to be constrained to rotate with it. The washer has two protuberances, each engaged in a notch of shape complementary to the rod. The anti-rotation system has a ring with an inner periphery of with a shape complementary
(Continued)

to that of an outer periphery of the nut in order to be secured to the nut. The ring is secured to the washer by a screw.

9 Claims, 3 Drawing Sheets

(58) Field of Classification Search
USPC ......... 403/256, 316, 338; 411/119, 120, 121
See application file for complete search history.

(56) References Cited

U.S. PATENT DOCUMENTS

| | | | | | |
|---|---|---|---|---|---|
| 1,951,228 | A * | 3/1934 | Lavater | F16B 39/10 411/313 |
| 2,370,944 | A * | 3/1945 | Emerson | F16B 39/10 411/976 |
| 4,274,754 | A * | 6/1981 | Cohen | F16C 7/06 403/14 |
| 4,284,114 | A * | 8/1981 | Korenobu | E01B 9/12 411/119 |
| 4,735,533 | A * | 4/1988 | Gallagher | F16K 35/00 411/119 |
| 4,906,150 | A * | 3/1990 | Bennett | F16B 39/10 411/432 |
| 4,970,801 | A * | 11/1990 | Specktor | B62D 17/00 33/600 |
| 5,080,544 | A * | 1/1992 | Bruyere | F16B 39/10 411/200 |
| 5,312,139 | A * | 5/1994 | Marks | F16L 19/005 285/39 |
| 5,967,723 | A * | 10/1999 | Duran | F16B 39/24 411/131 |
| 6,880,433 | B1 * | 4/2005 | Tanimura | F16B 39/02 411/119 |
| 6,896,438 | B1 * | 5/2005 | Chen | F16B 2/065 403/373 |
| 6,976,816 | B2 * | 12/2005 | Slesinski | F16C 25/06 411/122 |
| 6,976,817 | B1 * | 12/2005 | Grainger | F16B 39/103 411/329 |
| 7,029,218 | B2 * | 4/2006 | Peterkort | F16B 39/10 411/119 |
| 7,316,533 | B2 * | 1/2008 | Tanimura | F16B 39/20 411/536 |
| 7,922,433 | B2 * | 4/2011 | Ricciardo | F16B 39/10 411/161 |
| 8,038,362 | B2 * | 10/2011 | Kawanabe | F16B 21/12 403/14 |
| 8,113,754 | B2 * | 2/2012 | Dahl | F16B 39/02 411/320 |
| 8,628,285 | B2 * | 1/2014 | Bridgewater | F16B 39/36 411/270 |
| 9,593,708 | B2 * | 3/2017 | Cassagne | B64D 27/402 |
| 9,828,103 | B2 * | 11/2017 | Cassagne | B64D 27/402 |
| 10,041,525 | B2 * | 8/2018 | Hartanto | F16B 39/06 |
| 11,686,340 | B2 * | 6/2023 | Goupil | B64C 1/06 403/1 |
| 2002/0110437 | A1 * | 8/2002 | Kirimoto | F16B 23/0061 411/119 |
| 2006/0029485 | A1 | 2/2006 | Weinstein | |
| 2006/0233627 | A1 * | 10/2006 | Weinstein | F16J 15/3276 411/369 |
| 2015/0166189 | A1 * | 6/2015 | Cassagne | B64D 27/40 244/54 |
| 2018/0119722 | A1 * | 5/2018 | Vik | F16B 39/103 |
| 2021/0071786 | A1 | 3/2021 | Kogure | |
| 2021/0108670 | A1 * | 4/2021 | Beaumel | F16B 39/10 |

FOREIGN PATENT DOCUMENTS

| | | | | | |
|---|---|---|---|---|---|
| FR | 2 952 146 | A1 | 5/2011 | |
| FR | 3014973 | A1 * | 6/2015 | B64D 27/402 |
| GB | 236360 | A * | 7/1925 | F16B 39/10 |
| KR | 200197004 | Y1 * | 9/2000 | F16B 39/24 |
| WO | WO-8700592 | A1 * | 1/1987 | F16B 39/10 |
| WO | WO-2008068300 | A1 * | 6/2008 | F16B 39/14 |

OTHER PUBLICATIONS

Written Opinion mailed May 6, 2022, issued in corresponding International Application No. PCT/FR2022/050034, filed Jan. 6, 2022, 4 pages.

First Office Action received Jan. 10, 2026, issued in corresponding Chinese Application No. 202280009630.8, filed Jan. 13, 2021, 10 pages.

* cited by examiner

DEVICE FOR CONNECTING MECHANICAL PARTS WITH AXIAL CLEARANCE

FIELD OF THE DISCLOSURE

The present disclosure relates to a connecting device designed to connect two separate mechanical parts together with an axial clearance. The disclosure also relates to a mechanical assembly for an aircraft, in particular a transport plane or a helicopter, connected by such a connecting device. The disclosure also relates to a method for assembling such a mechanical assembly.

BACKGROUND

The technical background comprises in particular the documents FR-A1-539 919, US-A1-2006/0029485, US R E15,379 and FR-A1-2 952 146.

Such a connecting device can be used in any field, particularly but not exclusively aerospace, requiring a structural assembly operation between two mechanical parts with a certain amount of axial clearance.

It may be a compass formed by the two mechanical parts. The compass is connected at one end to a sliding rod attached to the wheels of an aircraft and at the opposite end to the box of the landing gear. The aircraft may be a transport plane or a helicopter.

Conventionally, the two mechanical parts are connected together by means of a rod which passes through them. The translational movements of the mechanical parts along the rod are blocked on one side by a stop resting against one of the mechanical parts and on the opposite side by a nut screwed onto the rod until it bears against the other mechanical part.

At this stage of the assembly, it is necessary to generate a clearance along the axis of the rod to allow the mechanical parts to articulate in relation to each other.

In a known way, an operator can unscrew the nut by a certain angle in order, depending on the thread pitch of the thread of the rod, to displace it by a distance corresponding to the desired axial clearance between the mechanical parts. The nut is then immobilised to the rod, for example by means of a pin, to keep the axial clearance constant.

This axial clearance required for the articulation of the mechanical parts is generally no more than 0.1 millimetres. The unscrewing and the blocking of the nut on the rod are therefore meticulous and complex operations which, if executed incorrectly, can lead to a malfunctioning of the compass.

In some connecting devices, such as the one described in the application FR-A1-2 952 146, the nut screwed onto the threaded portion of the rod incorporates, as part of its ergonomics, slits provided in skirts. The dimensions of these slits represent the possible unscrewing angle of the nut and therefore the desired axial clearance. A washer provided with lugs is then mounted against the nut on splines in the rod. The lugs are engaged in the skirts and the angular position of the lugs in the slit of each skirt is adjusted and then attached by screws that block the assembly of these elements in rotation.

There are also other connecting devices in which the nut is blocked in rotation on the rod by means of a number of deformable lock washers. These lock washers are engaged on splines that are present alongside the thread so that they become secured in rotation to the rod. The blocking of the nut on the rod and therefore the axial clearance between the mechanical parts is based on the conformation of an internal toothing of the lock washers with the splines on the rod.

However, the small dimensions of the assembly of these elements make the blocking of the nut fragile against the effects of corrosion. Wear caused by the use of the connecting device or by successive mounting/dismounting tends to cause the splines on the rod to disappear, which can lead to a change in the axial clearance between the mechanical parts by unscrewing the nut, or even to the loss of the nut and therefore of the connecting device.

The aim of the present disclosure is to overcome this disadvantage by proposing a connecting device in which an anti-rotation system allowing the nut to be locked against rotation on the rod is corrosion-resistant.

SUMMARY

To this end, the disclosure relates to a connecting device intended to connect together two separate mechanical parts, the device comprising:

- a rod having a longitudinal axis and comprising a section intended to be inserted at least partly into aligned clevises of the mechanical parts, the section extending between an axial stop and a threaded portion of the rod,
- a nut configured to be screwed onto the threaded portion of the rod so as to hold the two mechanical parts between the axial stop and the nut, and
- an anti-rotation system configured to block in rotation the nut, the anti-rotation system comprising:
  - a washer mounted around the rod and configured to cooperate by complementary shapes with the rod so that the washer is secured in rotation to the rod,
  - the washer comprising at least one protuberance extending inwardly with respect to the longitudinal axis, the or each protuberance being engaged in a notch of complementary shape in the rod, and
  - a ring mounted around the nut, the ring comprising an internal periphery complementary in shape to that of an external periphery of the nut so that the ring is secured in rotation to the nut,
- characterised in that the anti-rotation system also comprises a screw which is configured to ensure that the ring and the washer are secured axially in rotation,
- and in that the ring also comprises:
  - an axial slot so as to minimise the mounting clearance on the nut,
  - two circumferential ends which are located on either side of the axial slot, each of the circumferential ends extending into an attachment tab comprising a central orifice for the passage of the screw, the washer comprising a protrusion configured so as to be interposed between the tabs, the protrusion comprising an orifice for the passage of the screw.

Thus, thanks to the disclosure, the blocking of the anti-rotation system for blocking in rotation the nut on the rod is carried out by a limited number of protuberances on a washer and notches on the rod. In addition, the presence of hollowed elements on the rod, such as notches that are large in relation to the size of the rod, allows to increase the robustness of the connecting device against the corrosion and wear.

The connecting device according to the disclosure may also have one or more of the following characteristic, taken alone or in combination with each other:

- the washer comprises a number of protuberances of between two and four, the protuberances being regularly arranged around the longitudinal axis, the internal periphery of the ring comprises a toothing and the external periphery of the nut is of the hexagonal type, the screw extends in a plane substantially perpendicular to the longitudinal axis, and the screw is screwed into a tightening nut which comprises at least one transverse recess intended to be aligned with a transverse orifice of the screw for the passage of an immobilising element such as a pin or a brake wire.

The present disclosure also relates to a mechanical assembly for an aircraft, in particular for a helicopter or a plane, comprising mechanical parts connected together by a connecting device as described above.

The present disclosure also relates to a method for assembling two mechanical parts, using a connecting device such as that described above.

According to the disclosure, the assembly method comprises steps consisting successively of at least:

inserting the rod into the aligned clevises of the two mechanical parts until the axial stop bears against one of the two mechanical parts;

mounting the washer around the rod against the other of the two mechanical parts;

screwing the nut onto the threaded portion of the rod until it is in a position of contact with the washer;

mounting the ring around the nut;

unscrewing the nut from the contact position to a stop position;

interposing the protrusion of the washer between the tabs of the ring, and blocking the nut in rotation in the stop position by the screw, this screw passing through orifices of the tabs and of the protrusion and being screwed into a tightening nut.

DESCRIPTION OF THE DRAWINGS

Further characteristics and advantages of the disclosure will become apparent from the following detailed description, for the understanding of which reference is made to the attached drawings in which.

DETAILED DESCRIPTION

In the following description, the disclosure generally applies to a connecting device 1 (hereinafter "device 1") designed to connect together two separate mechanical parts P1 and P2 with an axial clearance. These mechanical parts P1 and P2 can be the two branches of a compass for an aircraft landing gear which connects a sliding rod carrying the wheels to a box secured to the body of the aircraft.

Figure 1:
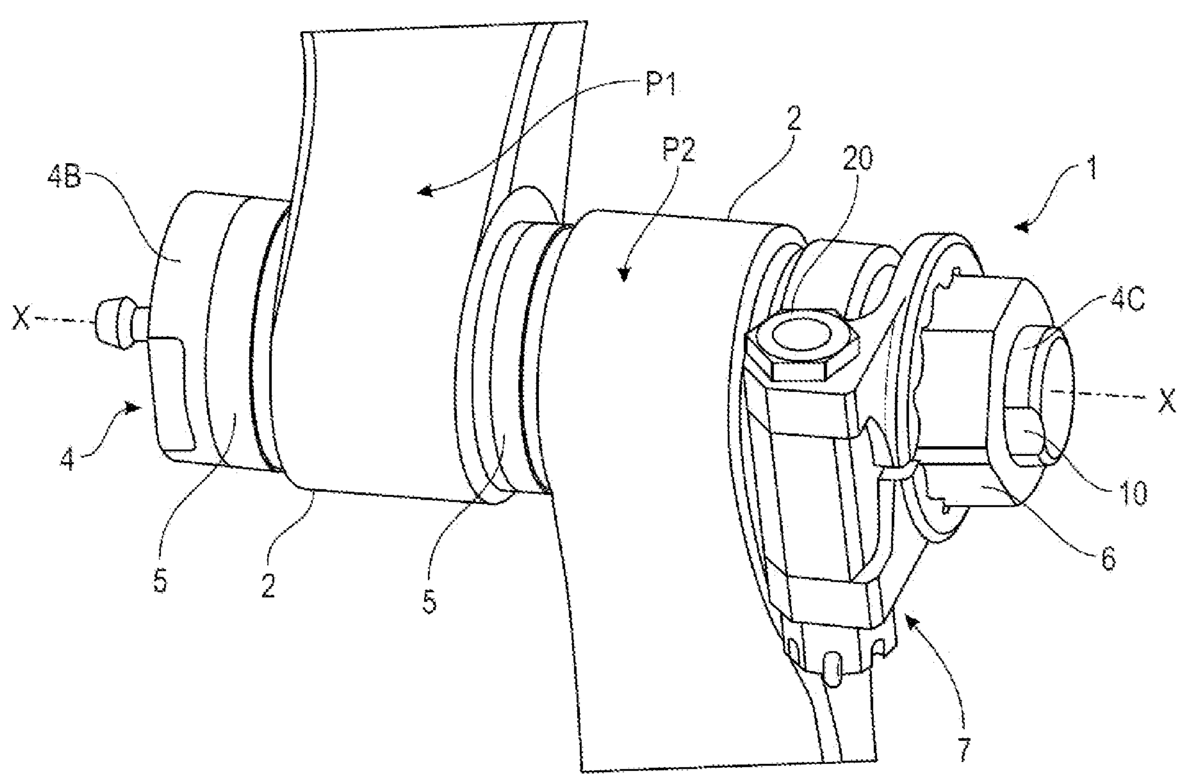
FIG. 1 shows a schematic perspective view of a connecting device in a particular embodiment.
Figure 2:
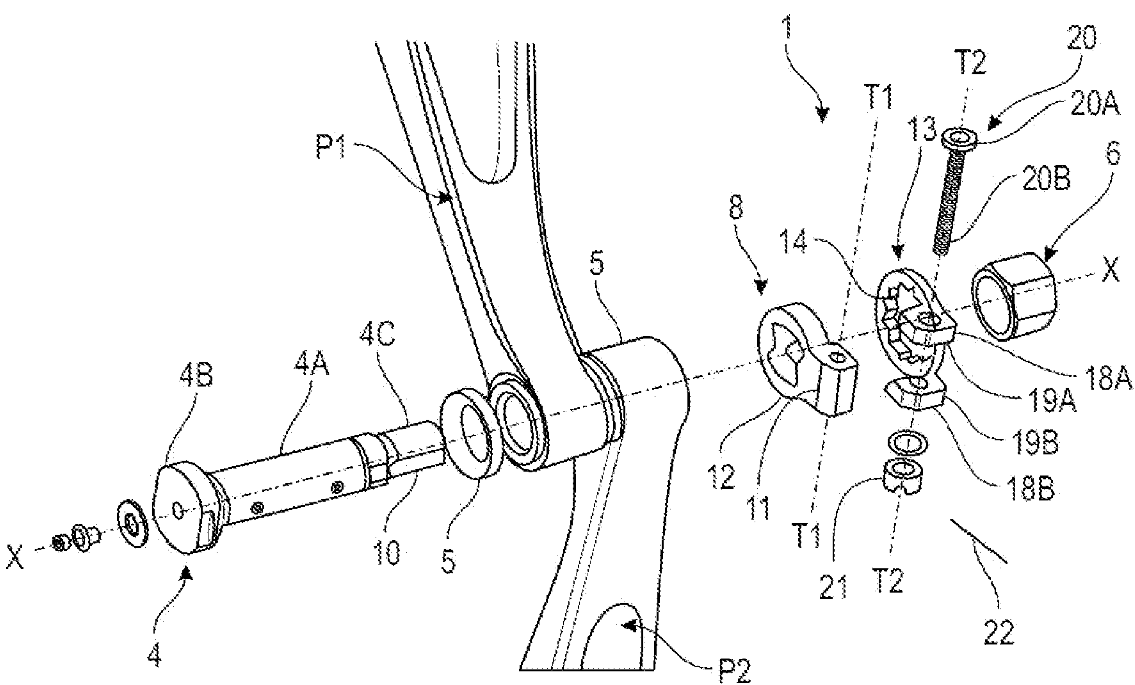
FIG. 2 shows a schematic exploded perspective view of a connecting device in a preferred embodiment.

The mechanical parts P1 and P2 are each provided with a clevis 2, 3 of circular cross-section, as shown in FIGS. 1 and 2. For the assembly, the two mechanical parts P1 and P2 are brought into contact with each other or each in contact with a support washer 5, so as to superimpose the clevises 2 and 3 by means of which the connecting device 1 connects together the mechanical parts P1 and P2 by attaching an axial 30 clearance. This axial clearance, which may be between 0 and 0.1 millimetres, allows one mechanical part P1 to be articulated relative to the other mechanical part P2 about an axis X-X referred to as longitudinal.

By convention in this application, the terms "internal" and "external" are used in reference to a positioning in relation to the hinge or longitudinal axis X-X. Thus, a cylinder extending along the axis X-X comprises an internal face facing towards the axis X-X and an external face opposite its internal face. "Longitudinal/axial" or "longitudinally/axially" means any direction parallel to the axis X-X, and "transversely" or "transversal" means any direction perpendicular to the axis X-X.

As shown in FIGS. 1 and 2, the device 1 comprises a rod 4 with a longitudinal shape arranged along the axis X-X. The rod 4 is formed by a section 4A of circular cross-section to allow the mechanical parts P1 and P2 to be articulated together. The section 4 extends between an axial stop 4B and a threaded portion 4C. In a preferred embodiment, the thread pitch of the threaded portion 4C is between 0.6 millimetres and 1 millimetre. At least one portion of the section 4A fits into the clevises 2 and 3 which are aligned along the axis X-X so that the axial stop 4B bears against one of the mechanical parts P1 and the threaded portion 4C extends beyond the other mechanical part P2. A support washer 5 can be arranged between the axial stop 4B and the mechanical part P1 against which it bears.

Figure 4:
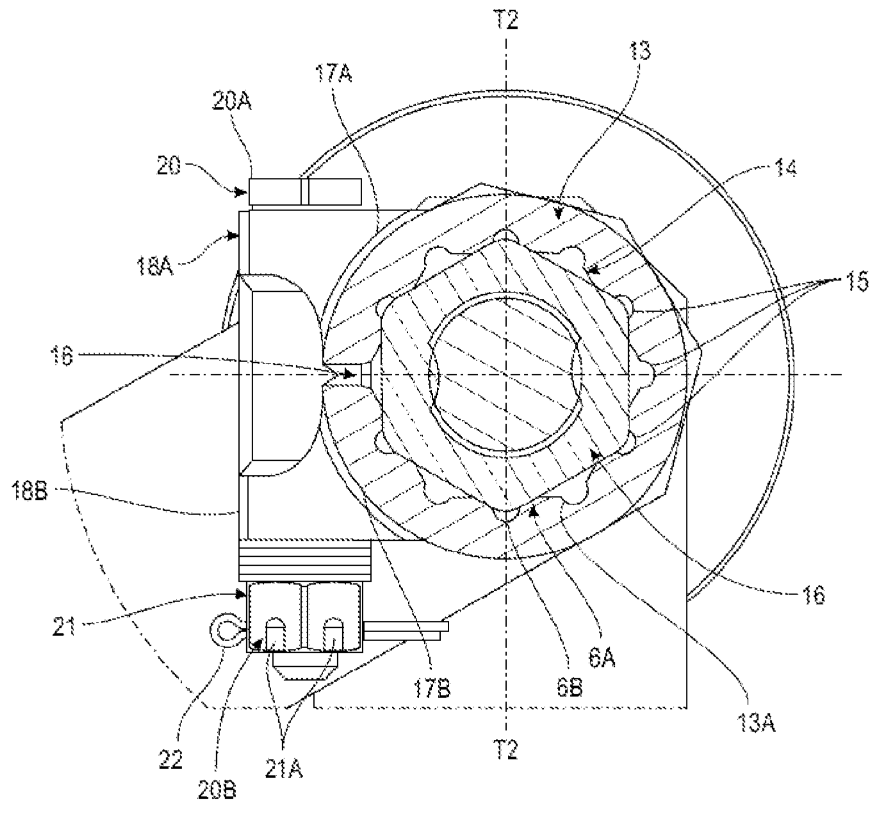
FIG. 4 shows a schematic cross-sectional view of a nut, a ring and a screw, according to a preferred embodiment.

The device 1 also comprises a nut 6 which is screwed onto the threaded portion 4C so as to hold the mechanical parts P1 and P2 together, between the axial stop 4B and the nut 6. As shown in FIGS. 1, 2 and 4, the nut 6 comprises an external periphery 6A on which longitudinally extending ridges 6B are arranged. In a preferred embodiment, the nut 6 is of the hexagonal type.

The device 1 also comprises an anti-rotation system 7 which allows to block any rotational movement of the nut 6 relative to the rod 4. This anti-rotation system 7 comprises in particular a washer 8 mounted around the rod 4 and a ring 13 mounted around the nut 6. The washer 8 and the ring 13 are attached together by a screw 20.

Figure 3:
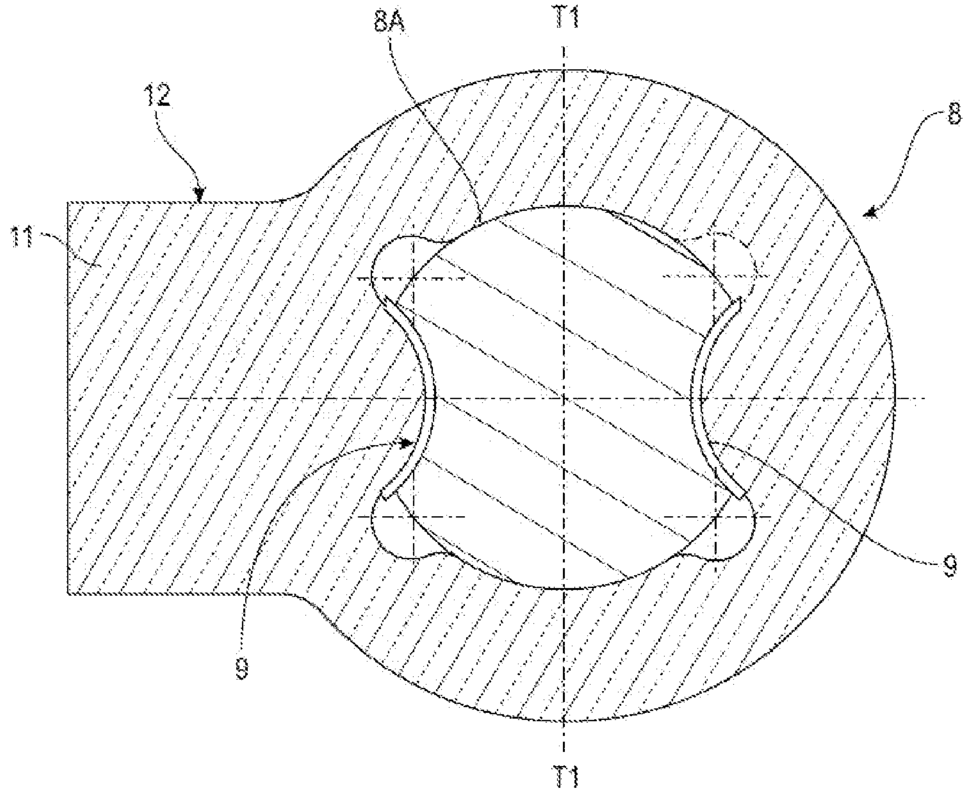
FIG. 3 shows a schematic partial cross-section of a washer, according to a preferred embodiment.

In a preferred embodiment, the washer 8 cooperates by complementary shapes with the rod 4 so as to be secured to it in rotation about the axis X-X. As shown in FIGS. 2 and 3, the washer 8 is provided with protuberances 9 extending along the axis X-X and inwards relative to the axis X-X. There are two protuberances, although the washer 8 may comprise three or four (not shown). The protuberances 9 have a rounded cross-section. They are arranged regularly around the axis X-X on an internal face 8A of the washer 8. Thus, as shown in FIG. 3, two protuberances 9 are arranged diametrically opposite each other in relation to the axis X-X.

As shown in FIG. 2, the rod 4 comprises notches 10 in which the protuberances 9 are engaged. Each of the notches 10 extends longitudinally on the threaded portion 4C and has a shape complementary to the shape of a protuberance 9, so that once each protuberance 9 is engaged in a notch 10, the washer 8 is secured in rotation to the rod 4. The number of notches 10 may be equal to or greater than the number of protuberances 9 carried by the washer 8.

In an advantageous embodiment, the washer 8 also comprises a protrusion 11. This protrusion 11 extends outwards from the washer 8 in relation to axis X-X. The protrusion 11 comprises an orifice 12 which passes through it along a transverse axis T1-T1 which is perpendicular to the axis X-X. The orifice 12 allows the passage of the screw 20.

In a preferred embodiment, the ring 13 of the anti-rotation system 7 comprises an internal face 13A provided with a toothing 14. As shown in FIG. 4, the toothing 14 comprise twelve teeth 15 forming a bi-hexagonal indentation. The insertion of each ridge 6B between two successive teeth of the toothing makes the ring 13 secured in rotation to the nut 6. Alternatively, the toothing form a hexagonal indentation (not shown).

The ring 13 also comprises, an axial slot 16 so as to minimise the assembly clearance around the nut 6, as shown in FIGS. 1 and 4. The ring 13 comprises two circumferential ends 17A and 17B which are located on either side of the slot 16. Each of these ends 17A, 17B extends into an attachment tab 18A, 18B extending outwards from the ring 13. Each tab 18A, 18B is provided with a central orifice 19A, 19B. The tabs 18A and 18B are oriented so that the central orifices 19A and 19B face each other to allow the screw 20 to pass through the tabs 18A and 18B. The central orifices 19A and 19B are aligned along a transverse axis T2-T2 perpendicular to the axis X-X. Furthermore, as shown in FIGS. 1 and 4, when the transverse axes T1-T1 and T2-T2 are substantially identical, the protrusion 11 can be interposed between the tabs 18A and 18B so that the orifice 12 is aligned with the central orifices 19A and 19B.

According to a preferred embodiment, the screw 20 is engaged in the central orifices 19A and 19B and in the orifice 12 of the protrusion 11 to make the ring 13 secured axially and rotationally to the washer 8. The screw 20 extends along the axis T2-T2 in a plane perpendicular to the axis X-X. It comprises a stop 20A bearing against one of the tabs 18A and a transverse orifice 20B. The screw 20 is screwed into a tightening nut 21 which rests against the other tab 18B. The tightening nut 21 comprises a transverse recess 21A which is aligned with the transverse orifice 20B. By way of example, the tightening nut 21 may be a double-slotted nut, each space between two successive slots forming a potential transverse recess 21A. As shown in FIGS. 1 and 4, an immobilisation element 22 can be inserted through the transverse orifice 20B and the transverse recess 21A so as to prevent any untightening of the tightening nut 21 on the screw 20. For example, the immobilisation element 22 may be a pin or a brake wire.

The device 1, as described above, is assembled with the two mechanical parts P1 and P2 to form a mechanical assembly for an aircraft, in particular a helicopter or a transport plane. In a preferred application of the disclosure, the mechanical assembly is a compass connecting the sliding rod carrying the wheels to a landing gear box.

Figure 5:
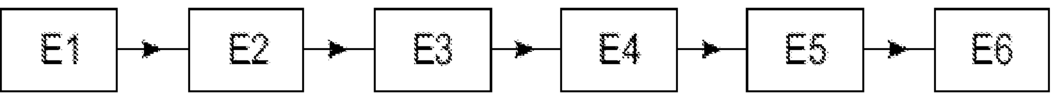
FIG. 5 schematically illustrates the main steps in a method for assembling such a mechanical assembly.

As shown in FIG. 5, the assembly method for such a mechanical assembly comprises, in particular, the steps E1 to E6 carried out in succession.

The step E1 consists of inserting the section 4A of the rod 4 into the clevises 2 and 3, which are aligned along the axis X-X. The stop 4B on the rod 4 then comes to rest against one of the mechanical parts P1. A support washer 5 can be interposed between the stop 4B and the mechanical part P1.

During the step E2, the washer 8 is mounted around the rod 4 and brought into contact with the other mechanical part P2. A support washer can also be inserted between the washer 8 and the mechanical part P2 (not shown). The mounting of the washer 8 against the mechanical part P2 (or against the support washer) is carried out by engaging each of the protuberances 9 in one of the notches 10 of the threaded portion 4C so that the washer 8 and the rod 4 are secured to each other in rotation about the axis X-X.

In the step E3, the nut 6 is screwed onto the threaded portion 4C of the rod 4 until it rests against the washer 8 in a position referred to as contact position. In this contact position, the nut 6 prevents any axial clearance between mechanical parts P1 and P2.

The ring 13 is then mounted around the nut 6 (step E4). The ridges 6B engage in certain spaces between two successive teeth 15 of the toothing 14 so that the angle of adjustment formed by the axis T2-T2 of alignment of the central orifices 19A and 19B and the axis T1-T1 along which the protrusion 11 is arranged is as small as possible. The value of this adjustment angle is between 0 degrees when the axes T1-T1 and T2-T2 are parallel and a maximum adjustment angle value equal to approximately 30 degrees. This maximum adjustment angle value corresponds to the value of the angle between two successive teeth 15 of the toothing 14 with a bi-hexagonal indentation.

In the step E5, the nut 6 is unscrewed by the amount of the adjustment angle so as to bring the nut 6 from the contact position to a stop position. The stop position represents the position of the nut 6 at which the protrusion 11 can be interposed between the tabs 18A and 18B, as shown in FIG. 1. Given the thread pitch of the rod 4, the unscrewing of the nut 6 from its contact position to its stop position allows to generate an axial clearance between the mechanical parts P1 and P2 of between 0 mm and 0.1 mm.

The step E6 then consists of engaging the screw 20 in the central orifices 19A and 19B and the orifice 12 of the protrusion 11 to attach the ring 13 axially and rotationally to the washer 8. The screw 20 is screwed into a tightening nut 21 and the assembly is immobilised by a pin 22 or a brake wire.

The connecting device 1 according to the disclosure has the particular advantage of allowing a fine axial clearance of between 0 millimetre and 0.1 millimetre to be installed for the hinge of the mechanical parts P1 and P2.

In addition, the presence of a screw 20 and a tightening nut 21 makes the lock more resistant to wear and corrosion. In addition, a pin 22 or a brake wire allows a double braking, making the lock of the nut 6 more secure.

The invention claimed is:

1. A connecting device for connecting together two separate mechanical parts, said device comprising:

a rod having a longitudinal axis (X-X) and comprising a section configured to be inserted at least partly into aligned clevises of said mechanical parts, said section extending between an axial stop and a threaded portion of the rod, a nut configured to be screwed onto said threaded portion of said rod so as to hold said two mechanical parts between said axial stop and said nut, and an anti-rotation system configured to block the nut from rotating, said anti-rotation system comprising:

a washer mounted around said rod and having a shape complementary with said rod such that said washer is configured to be rotationally secured to said rod, said washer comprising at least one protuberance extending inwards with respect to said longitudinal axis (X-X), the at least one protuberance being engaged in a notch of a complementary shape in said rod, and a ring mounted around the nut, said ring comprising an internal periphery complementary in shape to that of an external periphery of said nut so that said ring is secured in rotation to said nut, wherein said anti-rotation system further comprises a screw which is configured to ensure that said ring and said washer are secured axially in rotation, said ring further comprising:

an axial slot configured to minimize a mounting clearance on said nut, two circumferential ends which are located on opposing sides of said axial slot, each of said circumferential ends extending into an attachment tab, each tab comprising a central orifice for the passage of said screw, said washer comprising a protrusion configured to be interposed between said tabs, said protrusion comprising an orifice for the passage of said screw.

2. The connecting device according to claim 1, wherein the at least one protuberance of said washer comprises between two and four protuberances, said protuberances being arranged in a regular manner around said longitudinal axis (X-X).

3. The connecting device according to claim 1, wherein said internal periphery of the ring comprises a toothing and said external periphery of the nut is hexagonal.

4. The connecting device according to claim 1, wherein said screw extends in a plane perpendicular to said longitudinal axis (X-X).

5. The connecting device according to claim 1, wherein said screw is screwed into a tightening nut which comprises at least one transverse recess configured to be aligned with a transverse orifice of said screw for the passage of an immobilizing element.

6. The connecting device according to claim 5, wherein said immobilizing element is one of a pin or a brake wire.

7. A mechanical assembly for an aircraft comprising mechanical parts connected together by a connecting device according to claim 1.

8. The connecting device according to claim 1, wherein the attachment tabs are parallel to each other and extend along the axis (X-X) from a surface of the ring with which the washer come into contact.

9. A method for assembling two mechanical parts, using the connecting device according to claim 1, the method comprising the following successive steps:

inserting said rod into said aligned clevises of said two mechanical parts until said axial stop bears against one of said two mechanical parts;

mounting said washer around said rod against the other of said two mechanical parts;

screwing the nut onto the threaded portion of said rod until the nut is in a position of contact with said washer;

mounting the ring around the nut;

unscrewing said nut from said contact position to a stop position;

interposing the protrusion of the washer between the tabs of the ring, and blocking said nut in rotation in said stop position by said screw, the screw passing through the orifices of the tabs and the orifice of the protrusion and being screwed into a tightening nut.

* * * * *